United States Patent
Lee et al.

(10) Patent No.: US 7,249,537 B2
(45) Date of Patent: Jul. 31, 2007

(54) DOUBLE CLUTCH TRANSMISSION FOR A HYBRID ELECTRIC VEHICLE AND METHOD FOR OPERATING THE SAME

(75) Inventors: Hee Ra Lee, Anyang (KR); Chul Soo Kim, Suwon (KR); Tal Chol Kim, Hwaseong (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 106 days.

(21) Appl. No.: 11/023,700

(22) Filed: Dec. 27, 2004

(65) Prior Publication Data

US 2005/0139035 A1 Jun. 30, 2005

(30) Foreign Application Priority Data

Dec. 24, 2003 (KR) .................... 10-2003-0096568

(51) Int. Cl.
*F16H 37/06* (2006.01)
(52) U.S. Cl. ........................................ 74/661
(58) Field of Classification Search ............... 74/661, 74/330, 331
See application file for complete search history.

(56) References Cited

U.S. PATENT DOCUMENTS

| 6,490,945 | B2 * | 12/2002 | Bowen ................ 74/339 |
| 6,499,370 | B2 * | 12/2002 | Bowen ................ 74/330 |
| 6,634,247 | B2 * | 10/2003 | Pels et al. ............ 74/329 |
| 6,887,180 | B2 * | 5/2005 | Pels et al. ............ 477/3 |
| 6,945,893 | B2 * | 9/2005 | Grillo et al. .......... 475/5 |
| 7,040,186 | B2 * | 5/2006 | Pollak ................ 74/330 |
| 7,082,850 | B2 * | 8/2006 | Hughes .............. 74/329 |

FOREIGN PATENT DOCUMENTS

| DE | 19859458 | 6/1999 |
| DE | 10153014 | 5/2003 |
| DE | 10243375 | 12/2003 |
| JP | 2000-245013 | 9/2000 |

* cited by examiner

*Primary Examiner*—Dirk Wright
(74) *Attorney, Agent, or Firm*—Morgan Lewis & Bockius LLP (57) ABSTRACT

A double clutch transmission is described that ideally changes torque received from an engine and a motor by providing an optimal layout in power transmission scheme and motor location. Such a double clutch transmission is optimally adapted to a hybrid electric vehicle, and an optimal operation method for such a double clutch transmission is also provided, overcoming inefficiency in application of a conventional CVT to an HEV.

14 Claims, 7 Drawing Sheets

DOUBLE CLUTCH TRANSMISSION FOR A HYBRID ELECTRIC VEHICLE AND METHOD FOR OPERATING THE SAME

CROSS REFERENCE TO RELATED APPLICATION

This application claims priority to Korean Application No. 10-2003-0096568, filed on Dec. 24, 2003, the content of which is incorporated herein by reference.

FIELD OF THE INVENTION

The present invention relates to a double clutch transmission for a hybrid electric vehicle, and a method for operating the same.

BACKGROUND OF THE INVENTION

Generally, "hybrid vehicle" is a vehicle utilizing a plurality of power sources, and usually refers to a hybrid electric vehicle (HEV) that is driven by an engine and a motor. HEVs may be realized in various schemes adopting an engine and a motor, and a majority of schemes are based on a parallel construction or a series construction.

A series scheme is simpler in structure than a parallel scheme, so it is easier to control. However, series HEVs are less energy efficient than parallel HEVs because energy in series HEVs is first converted from mechanical energy of an engine into electrical energy in a battery, and then used for running a motor. Parallel HEVs, though more complicated in structure and control, are more energy efficient because mechanical energy of an engine and electrical energy of a battery may be simultaneously used. For this reason, a parallel scheme is usually adopted for a passenger car.

A series HEV, though less energy efficient than a parallel HEV, can always operate the engine at an optimal operating point. However, a parallel HEV cannot always operate the engine at an optimal operating point since the engine and the motor are mechanically coupled together through a transmission and the engine speed is correlated with the vehicle speed. Consequently, operating efficiency of an engine varies according to vehicle speed. In order to solve this problem, a continuously variable transmission (CVT) utilizing a metal belt is usually considered a favorable transmission because it enables the engine speed to be controlled independently from the vehicle speed. However, such a CVT requires very high hydraulic pressure for operation in comparison with other transmissions such as an automatic transmission. Therefore, in spite of various functionally favorable features, a CVT does not manifest particularly substantial energy efficiency.

On the other hand, in a double clutch transmission (DCT), torque from an engine is transmitted to two input shafts through two clutches, and is then changed and output using gears associated with the two input shafts. By adapting two clutches and an automatically shifting device to a scheme similar to a conventional manual transmission, the convenience of an automatic transmission may thusly be obtained while maintaining the efficiency level of a manual transmission.

Therefore, if such a DCT may be adapted to an HEV as its transmission system, the HEV's efficiency may be further enhanced from an HEV that uses a CVT.

The information disclosed in this Background of the Invention section is only for enhancement of understanding of the background of the invention, and should not be taken as an acknowledgement or any form of suggestion that this information forms the prior art that is already known in this country to a person of ordinary skill in the art.

SUMMARY OF THE INVENTION

The present invention provides a double clutch transmission for a hybrid electric vehicle, and an operation method structured to provide advantages of ideally changing and outputting torque of an engine and a motor.

An exemplary double clutch transmission for a hybrid electric vehicle having an engine and a motor according to an embodiment of the present invention includes a main input shaft, first and second input shafts, first and second clutches, a drive gear unit, first and second output devices, a differential gear, and a motor input/output unit.

The main input shaft receives torque from the engine. The first input shaft rotates coaxially with the main input shaft. The second input shaft rotates coaxially with the main input shaft and along an exterior circumference of the first input shaft. The first and second clutches selectively transmit a torque from the main input shaft to the first and second input shafts.

The drive gear unit includes a plurality of drive gears disposed respectively on the first and second input shafts.

The first output device includes a first output shaft disposed parallel to and apart from the first and second input shafts by a predetermined distance, and also includes a plurality of driven gears and a first output gear thereon, such that torque of drive gears on the first and second input shafts are selectively changed and output.

The second output device includes a second output shaft and a reverse idle shaft disposed parallel to and apart from the first and second input shafts by predetermined distances, a plurality of driven gears, a second output gear, a reverse driven gear disposed on the second input shaft, and a plurality of reverse mediating gears disposed on the reverse idle shaft, such that torque of drive gears on the first and second input shafts are selectively changed and output.

The differential gear is commonly connected to the first output gear and the second output gear.

The motor input/output unit selectively transmits a torque of the motor to the second input shaft through a plurality of gears and a drive gear on the second input shaft.

In another embodiment, the drive gear unit includes first, third, and fifth drive gears formed on one input shaft among the first and second input shafts, and second, fourth, and sixth drive gears formed on another input shaft among the first and second input shafts.

In a further embodiment, the first, third, and fifth drive gears are formed on the first input shaft, and the second, fourth, and sixth drive gears are formed on the second input shaft.

In yet another embodiment, the first, second, third, fourth, fifth, and sixth drive gears are disposed in a sequence of the second drive gear, the fourth drive gear, the sixth drive gear, the third drive gear, the first drive gear, and the fifth drive gear from the engine.

In yet a further embodiment, the first output device includes the first output shaft; first, second, third, and fourth driven gears; first and second synchronizing devices; and the first output gear. The first, second, third, and fourth driven gears are disposed on the first output shaft and are respectively engaged with the first, second, third, and fourth drive gears. The first synchronizing device selectively transmits torque of the first and third driven gears to the first output shaft. The second synchronizing device selectively transmits a torque of the second and fourth driven gears to the first output shaft. The first output gear is disposed on the first output shaft and engaged with the differential gear. Accordingly, torque of the first, second, third, and fourth drive gears on the first and second input shafts are selectively changed and output.

In another further embodiment, the second output device includes the first output shaft, the reverse idle shaft, fifth and sixth driven gears, first and second mediating gears, a reverse driven gear, third and fourth synchronizing devices, and the second output gear. The fifth and sixth driven gears are disposed on the second output shaft and respectively engaged with the fifth and sixth drive gears. The first mediating gear is disposed on the reverse idle shaft and is engaged with the first drive gear. The second mediating gear is disposed on the reverse idle shaft. The reverse driven gear is disposed on the second output shaft and is engaged with the second mediating gear. The third synchronizing device selectively transmits a torque of the fifth driven gear to the second output shaft. The fourth synchronizing device selectively transmits torque of the sixth and reverse driven gears to the second output shaft. The second output gear is disposed on the second output shaft and is engaged with the differential gear. Accordingly, torque of the first, fifth, and sixth drive gears on the first and second input shafts are selectively changed and output.

In yet a further embodiment, the motor input/output unit includes a motor gear, a motor idle shaft, and a motor idle gear. The motor gear is disposed on a rotation shaft of the motor. The motor idle shaft is disposed parallel to and apart from the second input shaft by a predetermined distance. The motor idle gear is formed on the motor idle shaft and is commonly engaged with the motor gear and one drive gear on the second input shaft. In this embodiment, the one drive gear on the second input shaft engaged with the motor idle gear may be a drive gear for a second speed.

An exemplary method for controlling a double clutch transmission is a method for controlling a double clutch transmission for a hybrid electric vehicle. The method includes determining an operation mode from an electric vehicle (EV) mode, a hybrid electric vehicle (HEV) mode, and a regenerative braking (RB) mode. The double clutch transmission is operated in accordance with the determined operation mode. In the EV mode, only the torque of the motor is changed and output. In the HEV mode, torque of both the motor and the engine are changed and output. In the RB mode, braking and inertial energy of the hybrid electric vehicle is reclaimed by electrical generation of the motor.

In a further embodiment, the EV mode is determined when a current state of charge (SOC) is above a predetermined SOC. In the EV mode, the engine is stopped and the first and second clutches are released while a torque of the motor is transmitted to a driven gear for a predetermined shift-speed, such that only the torque of the motor from battery power is changed and output. In a further embodiment, the predetermined shift-speed is a forward second speed.

In another further embodiment, in the EV mode, power of the motor is output to the differential gear sequentially through a motor gear, a motor idle gear, a second speed drive gear on the second input shaft, a second speed driven gear on the first output shaft, and the first output shaft.

In yet another embodiment, in the HEV mode, the engine is started by the motor, either the first or second clutches is engaged such that the engine's torque is transmitted to a driven gear for a target shift-speed, the motor's torque is transmitted to a second speed driven gear, and motor's torque is controlled based on a current vehicle speed and a depression amount of an accelerator pedal.

In another further embodiment, the RB mode is when the hybrid electric vehicle is decelerating by braking or is inertially running. In the RB mode, the first and second clutches are released while torque is transmitted from a driven gear for a predetermined shift-speed to the motor, such that the motor is driven as an electric generator by the braking and inertial energy of the hybrid electric vehicle.

In yet another embodiment, in the RB mode, the braking and inertial energy are input to the motor sequentially through the differential gear, the first output gear, the first output shaft, a second speed driven gear on the first output shaft, a second speed drive gear on the second input shaft, the motor idle gear, and the motor gear.

BRIEF DESCRIPTION OF THE DRAWINGS

The accompanying drawings illustrate an embodiment of the invention, and, together with the description, serve to explain the principles of the invention, wherein.

DETAILED DESCRIPTION OF THE PREFERRED EMBODIMENTS

An embodiment of the present invention will hereinafter be described in detail with reference to the accompanying drawings.

As is well known in the art, a double clutch transmission (DCT) includes two clutch devices within a transmission scheme that is similar to a manual transmission. In a DCT, torque from an engine is transmitted to two input shafts through two clutches, and is then changed and output using gears disposed on the two input shafts.

Figure 1:
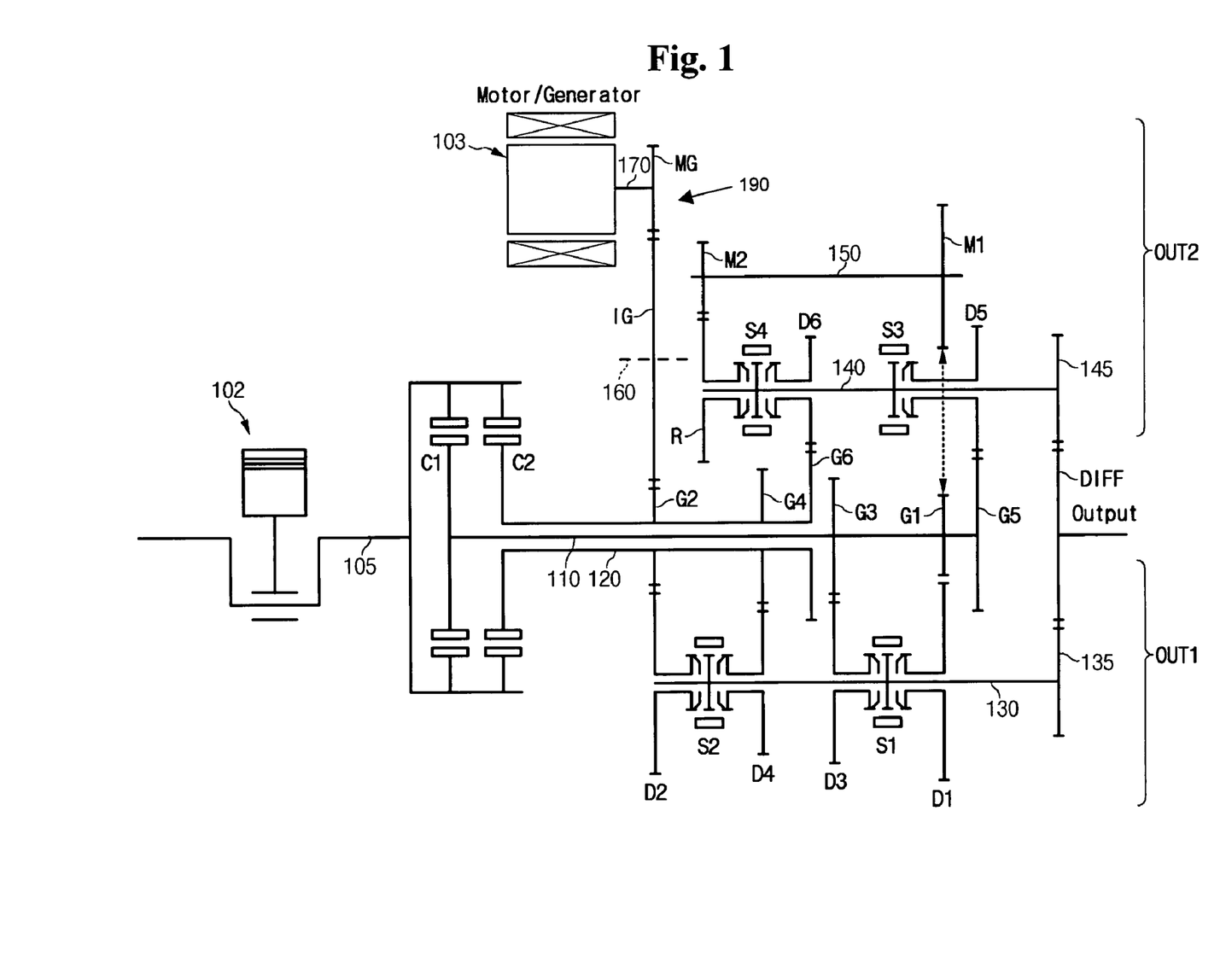
FIG. 1 is a schematic diagram of a DCT for an HEV according to an embodiment of the present invention.
Figure 2:
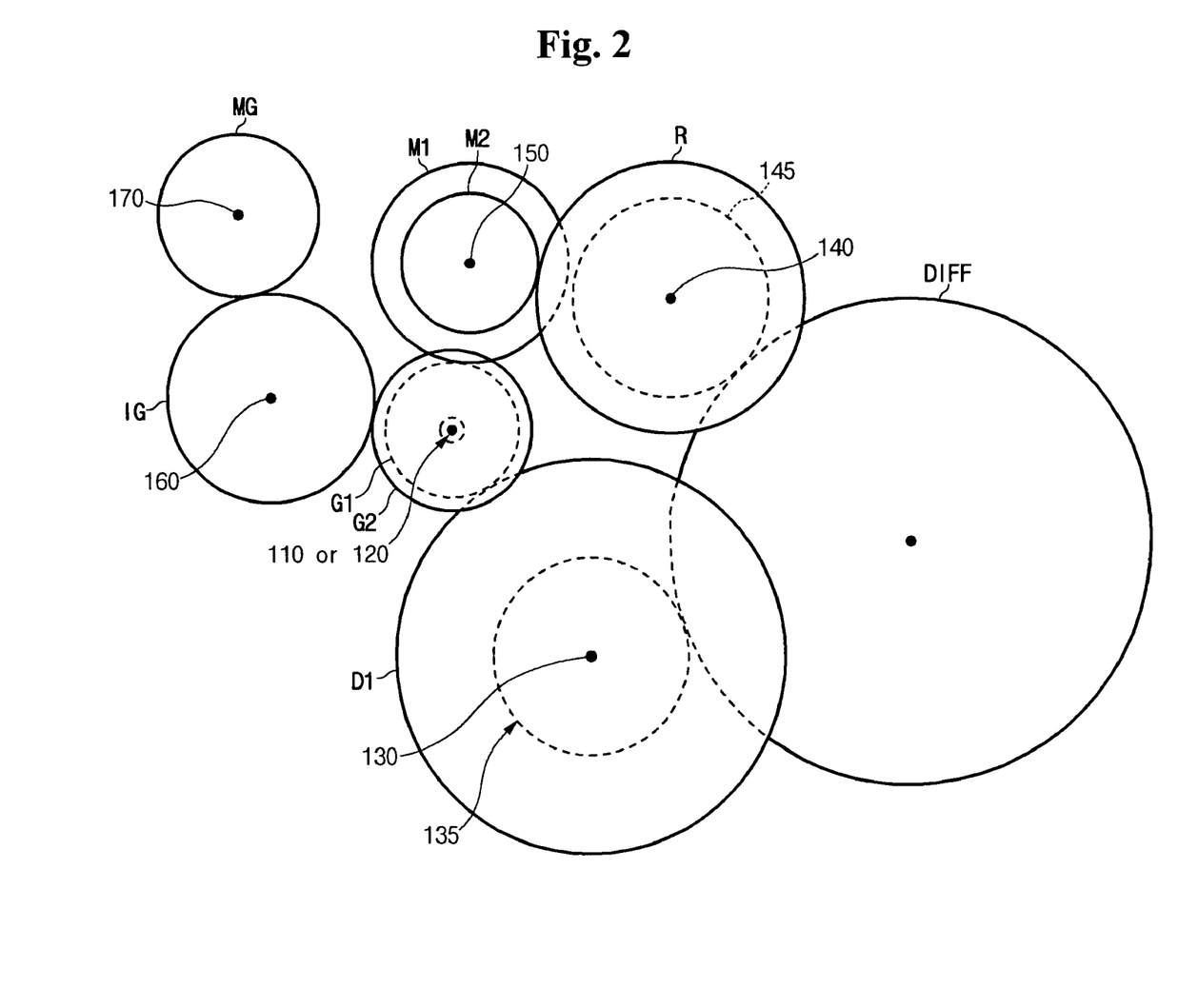
FIG. 2 is a drawing illustrating a disposition relationship among first and second input shafts, first and second output shafts, a reverse idle shaft, a differential gear, and a motor gear of a DCT for an HEV according to an embodiment of the present invention.

An embodiment of the present invention applies such a DCT to a hybrid electric vehicle (HEV) having two power sources of an engine and a motor. FIG. 1 is a schematic diagram of a DCT for an HEV according to an embodiment of the present invention, and FIG. 2 is a drawing illustrating a disposition relationship among first and second input shafts, first and second output shafts, a reverse idle shaft, a differential gear, and a motor gear of a DCT for an HEV according to an embodiment of the present invention.

As shown in FIG. 1, a DCT for an HEV according to an embodiment of the present invention includes a main input shaft 105; first and second input shafts 110 and 120; first and second clutches C1 and C2; first, second, third, fourth, fifth, and sixth drive gears G1, G2, G3, G4, G5, and G6; first and second output devices OUT1 and OUT2; differential gear DIFF; and a motor input/output unit 190.

The main input shaft 105 receives torque from an engine 102. The first input shaft 110 is rotatably disposed along a rotation axis of the main input shaft 105. The second input shaft 120 is disposed on the rotation axis of the main input shaft 105 rotatably around the first input shaft 110. The first and second clutches C1 and C2 selectively transmit the torque of the main input shaft 105 to the first and second input shafts 110 and 120, respectively. Therefore, the torque of the main input shaft 105 is transmitted to the first input shaft 110 when the first clutch C1 operates, and the torque of the main input shaft 105 is transmitted to the second input shaft 120 when the second clutch C2 operates. The first, third, and fifth drive gears G1, G3, and G5 are formed on the first input shaft 110, and the second, fourth, and sixth drive gears G2, G4, and G6 are formed on the second input shaft 120. Further, the first, third, and fifth drive gears G1, G3, and G5 are formed on the first input shaft 110 such that the third drive gear G3 is close to an end of the second input shaft 120, the fifth drive gear G5 is distal thereto, and the first drive gear G1 is between the third and fifth drive gears G3 and G5.

Additionally, the second, fourth, and sixth drive gears G2, G4, and G6 are formed on the second input shaft 120 such that the second drive gear G2 is close to the engine 102, the sixth drive gear G6 is distal to the engine 102, and the fourth drive gear G4 is between the second and sixth drive gears G2 and G6. Therefore, according to an embodiment of the present invention as shown in FIG. 1, the first, second, third, fourth, fifth, and sixth drive gears G1, G2, G3, G4, G5, and G6 are arranged in the following sequential order: the second drive gear G2, the fourth drive gear G4, the sixth drive gear G6, the third drive gear G3, the first drive gear G1, and then the fifth drive gear G5.

In addition, as shown in FIG. 1, the DCT includes a first output device OUT1 for selectively changing and outputting torque of the first, second, third, and fourth drive gears G1, G2, G3, and G4; and a second output device OUT2 for selectively changing and outputting torque of the first, fifth, and sixth drive gears G1, G5, and G6.

As shown in FIG. 1, the first output device OUT1 includes a first output shaft 130; first, second, third, and fourth driven gears D1, D2, D3, and D4; first and second synchronizing devices S1 and S2; and a first output gear 135. The first output shaft 130 is disposed parallel to and apart from the main input shaft 105 by a predetermined distance. The first, second, third, and fourth driven gears D1, D2, D3, and D4 are disposed on the first output shaft 130 while being respectively engaged with the first, second, third, and fourth drive gears G1, G2, G3, and G4. The first synchronizing device S1 selectively transmits torque from either the first or third driven gears D1 and D3 to the first output shaft 130. The second synchronizing device S2 selectively transmits torque from either the second or fourth driven gears D2 and D4 to the first output shaft 130. In addition, the first output gear 135 is disposed on the first output shaft 130 while being engaged with the differential gear DIFF such that torque received from the first, second, third, and fourth drive gears G1, G2, G3, and G4 is transmitted to the differential gear DIFF.

As shown in FIG. 1, the second output device OUT2 includes a second output shaft 140, a reverse idle shaft 150, fifth and sixth driven gears D5 and D6, first and second mediating gears M1 and M2, a reverse driven gear R, third and fourth synchronizing devices S3 and S4, and a second output gear 145. The second output shaft 140 and the reverse idle shaft 150 are disposed parallel to and apart from the main input shaft 105 by predetermined distances. The fifth and sixth driven gears D5 and D6 are disposed on the second output shaft 140 while being respectively engaged with the fifth and sixth drive gears G5 and G6. The first mediating gear M1 is disposed on the reverse idle shaft 150 while being engaged with the first drive gear G1. The reverse driven gear R is disposed on the second output shaft 140 while being engaged with the second mediating gear M2. The third synchronizing device S3 selectively transmits the torque of the fifth driven gear D5 to the second output shaft 140. The fourth synchronizing device S4 selectively transmits torque from either the reverse driven gear R or the sixth driven gear D6 to the second output shaft 140. In addition, the second output gear 145 is disposed on the second output shaft 140 while being engaged with the differential gear DIFF, such that a torque received from the first, fifth, and sixth drive gears G1, G5, and G6 is transmitted to the differential gear DIFF.

Details of the first, second, third, and fourth synchronizing devices S1, S2, S3, and S4 may be obviously understood by a person of ordinary skill in the art, referring to synchronizing devices of a conventional manual transmission operated by a shift fork. For example, the first, second, third, and fourth synchronizing devices S1, S2, S3, and S4 may be respectively operated by additional actuators controlled by a controller (not shown), in left and right directions in FIG. 1. The actuator may be driven by an electric motor or hydraulically driven by a solenoid valve controlling hydraulic pressure from an oil pump. These details are obvious to a person of ordinary skill in the art, and accordingly are not described in further detail herein.

The motor input/output unit 190 transmits the torque of a motor 103 (i.e., a motor-generator that can be operated for driving and generating functions), disposed to a transmission case (not shown), selectively to the second input shaft 120 through a motor gear MG, a motor idle gear IG, and the second drive gear G2 on the second input shaft 120. The motor gear MG is disposed on the motor 103 on its rotation shaft 170. The motor idle shaft 160 is disposed parallel to and apart from the second input shaft 120 by a predetermined distance. On the motor idle shaft 160, a motor idle gear IG is disposed while also being engaged with the motor gear MG and the second drive gear G2 on the second input shaft 120.

In FIG. 1, the engagement of the first mediating gear M1 and the first drive gear G1 and the engagement of the second output shaft 140 and the differential gear DIFF are shown by dotted lines. This is because the first and second input shafts 110 and 120, the first and second output shafts 130 and 140, the reverse idle shaft 150, and the differential gear DIFF are planarly drawn for illustrational convenience, although they are spatially disposed. Such a spatial disposition of the first and second input shafts 110 and 120, the first and second output shafts 130 and 140, the reverse idle shaft 150, and the differential gear DIFF appears in FIG. 2.

Figure 5:
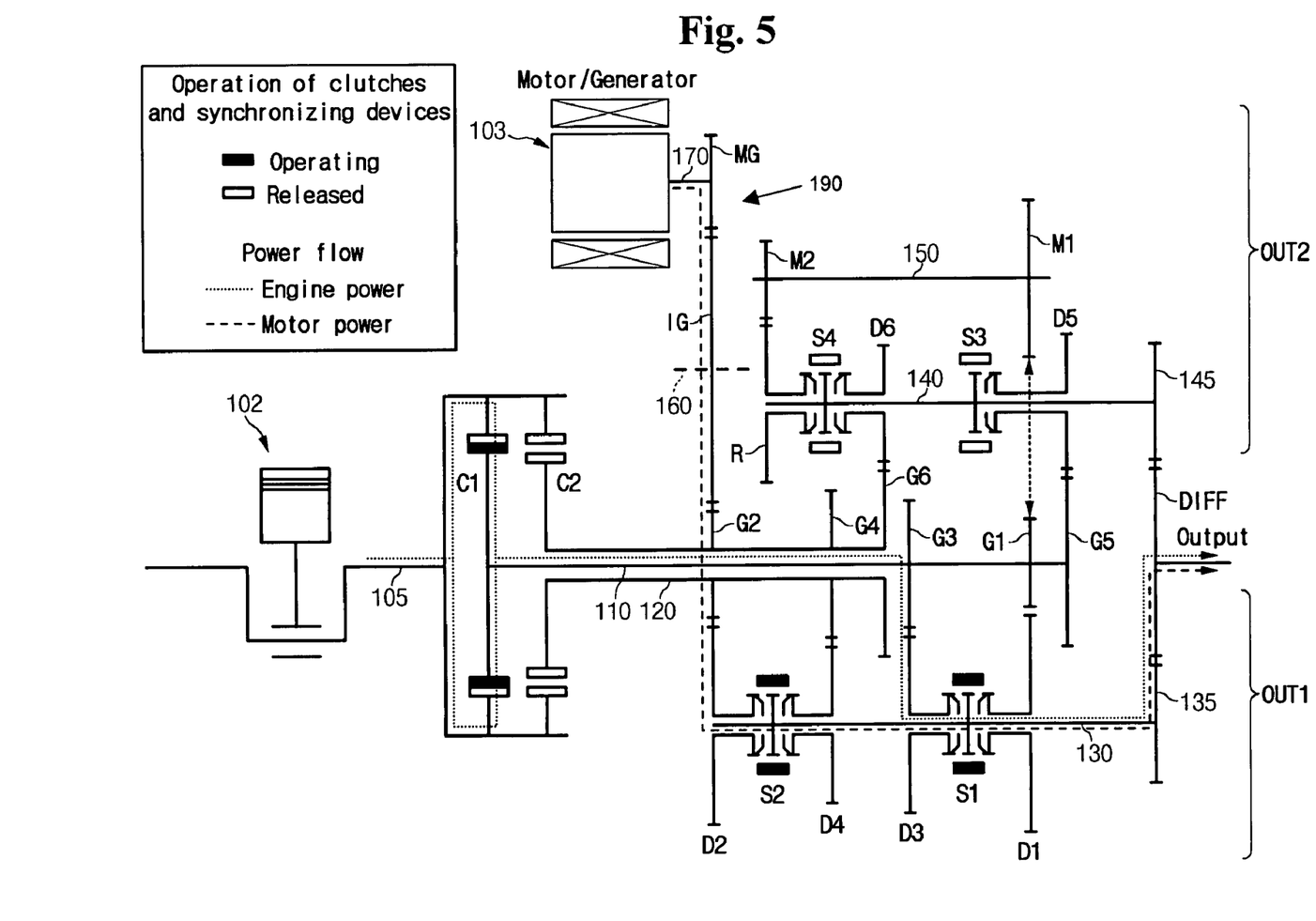
FIG. 5 is a diagram showing the operation of a DCT for an HEV according to an embodiment of the present invention when the HEV is running at a forward third speed in HEV mode.

While FIG. 1 is a schematic view of the DCT from above, FIG. 2 is a schematic view of the DCT from the left. Further, some gears shown in FIG. 5 are intentionally not shown in FIG. 2 for better understanding of the spatial relationship among rotation axes of rotating elements.

As shown in FIG. 2, the first and second output shaft 130 and 140 are disposed apart from the second input shaft 120. The reverse idle shaft 150, first input shaft 110, and second input shaft 140 are positioned such that their centers form three points of a triangle. The first mediating gear M1 on the idle shaft 150 is engaged with the first drive gear G1 of the first input shaft 110, and the second mediating gear M2 on the idle shaft 150 is engaged with the reverse driven gear R of the second output shaft 140. The differential gear DIFF and the first and second output shafts 130 and 140 are positioned such that their centers form three points of a triangle. Further, the differential gear DIFF is engaged with the first and second output gears 135 and 145 of the first and second output shafts 130 and 140. finally, the motor idle gear IG on the motor idle shaft 160 is engaged with the second drive gear G2 of the second input shaft 120 and the motor gear MG of the motor rotation shaft 170.

With such a DCT for an HEV, disposition of six drive gears on input shafts may enable a total of seven speeds (i.e., six forward speeds and one reverse speed). The shifting operations of such a DCT according to a first embodiment of the present invention will now be described in detail.

As can be seen in FIG. 1, to shift into the first speed, the first driven gear D1 and the first output shaft 130 are synchronously engaged by operating the first synchronizing device S1, and then operating the first clutch C1. To shift into the second speed, the second driven gear D2 and the first output shaft 130 are synchronously engaged by operating the second synchronizing device S2 while the first clutch C1 operates and the second clutch C2 is released, and then releasing the first clutch C1 and operating the second clutch C2. The first synchronizing device S1 is moved to a neutral position such that the first driven gear D1 and the first output shaft 130 are disengaged.

Similar to shiting into the first and second speeds, shifting to the third, fourth, fifth, sixth, and reverse speeds, involves synchronously engaging a corresponding driven gear and a corresponding output shaft by operating a corresponding synchronizing device while the first and second clutches C1 and C2 are alternately engaged. In addition, adjacent speeds require different synchronizing devices to be operated. Therefore, a release of a current speed and a realization of a target speed may be independently controlled during shifting from and to adjacent speeds. In addition, during shifting to an adjacent speed, various manipulation techniques that a driver may perform on a manual transmission (e.g., a half-clutch operation) may be realized by controlling engagement timing of an on-coming clutch and release timing of an off-going clutch.

Operation of such a DCT for an HEV is based on modes. Such operation modes include an electric vehicle (EV) mode wherein only torque of the motor 103 is utilized, a hybrid electric vehicle (HEV) mode wherein torque of the engine 102 is used as a main power source and torque of the motor 103 is used as an auxiliary power source, and a regenerative braking (RB) mode wherein braking and inertial energy of the hybrid electric vehicle is reclaimed by electric generation of the motor 103 and is used for recharging a battery (not shown).

Figure 3:
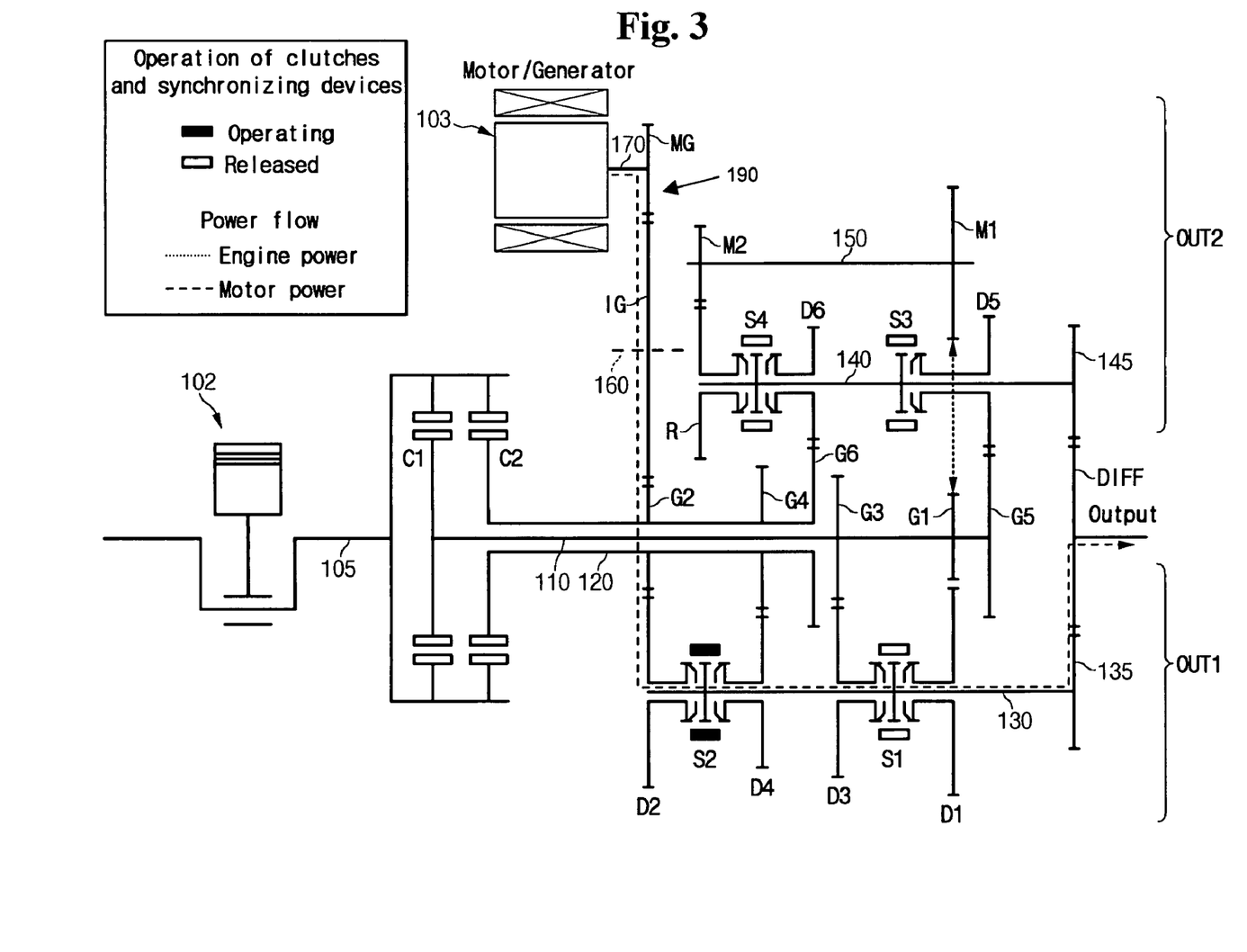
FIG. 3 is a diagram showing an EV mode operation of a DCT for an HEV according to an embodiment of the present invention.

In the EV mode, as shown in FIG. 3, the vehicle and the engine 102 are stopped and the first and second clutches C1 and C2 are released. When an accelerator pedal is depressed by a driver, the second synchronizing device S2 connects the second driven gear D2 and the first output shaft 130 when the battery's current state of charge (SOC) is sufficiently high (that is, when a current SOC is above a predetermined SOC). In this case, the motor 103 is driven by battery power. Accordingly, starting the HEV is accomplished by driving the motor 103, and, therefore, the HEV is driven at the second speed by the motor 103. In such an EV mode, power of the motor is output to the differential gear sequentially through a motor gear MG, a motor idle gear IG, a second drive gear G2 on the second input shaft 120, a second driven gear D2 on the first output shaft 130, and the first output shaft 130.

Figure 4:
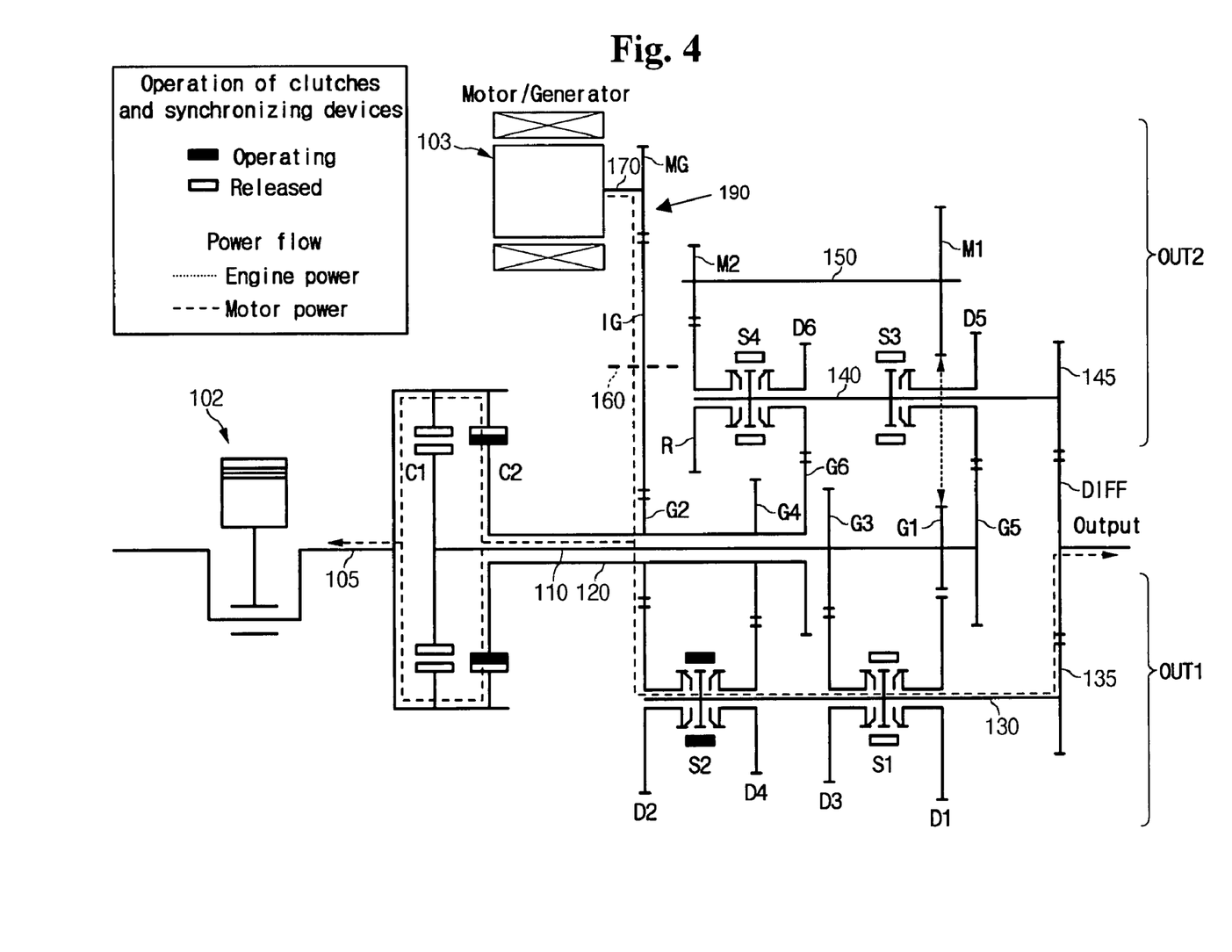
FIG. 4 is a diagram showing the operation of a DCT for an HEV according to an embodiment of the present invention when an engine is started while the DCT is in EV mode.

When shifting to a specific shift-speed (e.g., to the third speed) is required due to an increase of vehicle speed, the engine 102 is started. The vehicle is released from the EV mode and enters the HEV mode. When the engine 102 is required to be started while the DCT is operated in the EV mode, as shown in FIG. 4, the second clutch C2 is slip-controlled such that the engine 102 is started by torque from the motor 103. That is, by slip-controlling the second clutch C2, the engine 102 is firstly driven to an appropriate speed for firing. When the engine is started, the second clutch C2 is then released such that shifting to a target speed (e.g., the third speed) may be executed by operating a corresponding synchronizing device.

In the above description, the HEV is described to be started only by the power of the motor 103 when the current SOC of the battery is sufficiently high. When the SOC of the battery is not sufficiently high, the HEV is started and driven by immediately starting the engine 102 and using the power of the engine 102 as a primary power source. This HEV mode will now be described in detail with reference to FIG. 5, with respect to an exemplary case that the DCT is driven at the third speed in the HEV mode.

When shifting to the third speed while the HEV is running in EV mode, the engine 102 is started by the torque of the motor 103. The first synchronizing device S1 is then coupled with the third driven gear D3 and the second synchronizing device S2 remains coupled with the second driven gear D2 while the first clutch C1 is engaged and the second clutch C2 is released. In this case, the HEV is driven primarily by the torque of the engine 102 and secondarily by the torque of the motor 103. In a further embodiment, the auxiliary power of the motor 103 is determined on the basis of an accelerator pedal depression amount of a driver and a current vehicle speed.

Specific values of the auxiliary power of the motor 103 may be calculated and realized by a controller (not shown) according to a predetermined algorithm. They may be arbitrarily set by a person of ordinary skill in the art taking into account the design specifications of the DCT and/or HEV, and are therefore not described in further detail.

Figure 6:
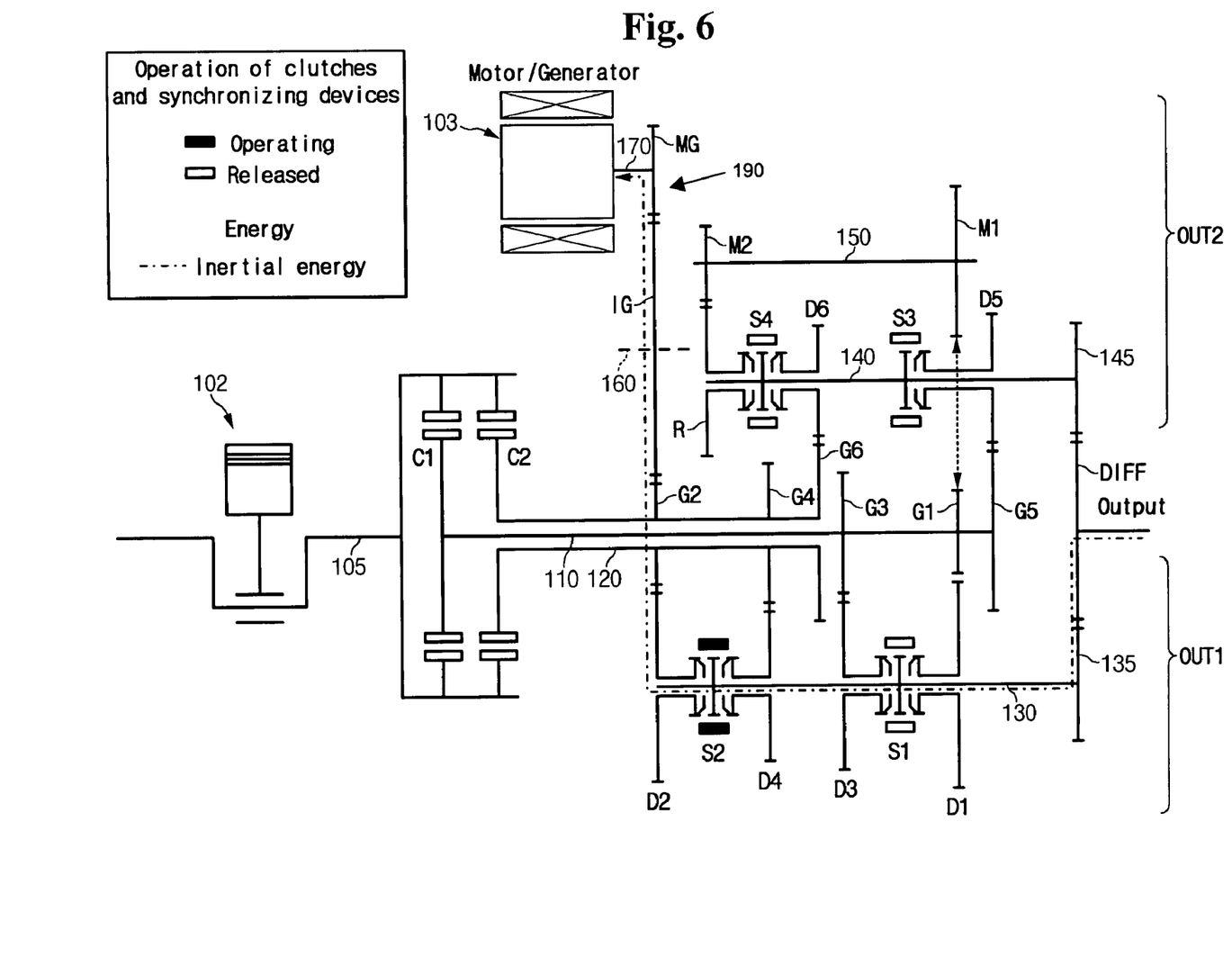
FIG. 6 is a diagram showing the RB mode operation of a DCT for an HEV according to an embodiment of the present invention.

In the case that the hybrid electric vehicle is decelerating by braking or is inertially running, RB mode is determined, releasing the first and second clutches C1 and C2 and coupling the second synchronizing device S2 with the second driven gear D2, as shown in FIG. 6. In RB mode, braking and inertial energy is reclaimed and charged into the battery by an electricity generation operation of the motor 103 according to a current vehicle speed. In this case, it is preferable that the operation of the motor 103 is controlled within an operation range that is most efficient for electricity generation. Specifically, such an operation range and controlling of the motor 103 therewithin with respect to the current vehicle speed may be implemented into and realized by a controller (not shown). These may be arbitrarily set by a person of ordinary skill in the art taking into account the design specification of the DCT and/or HEV, and are not therefore described in further detail.

Figure 7:
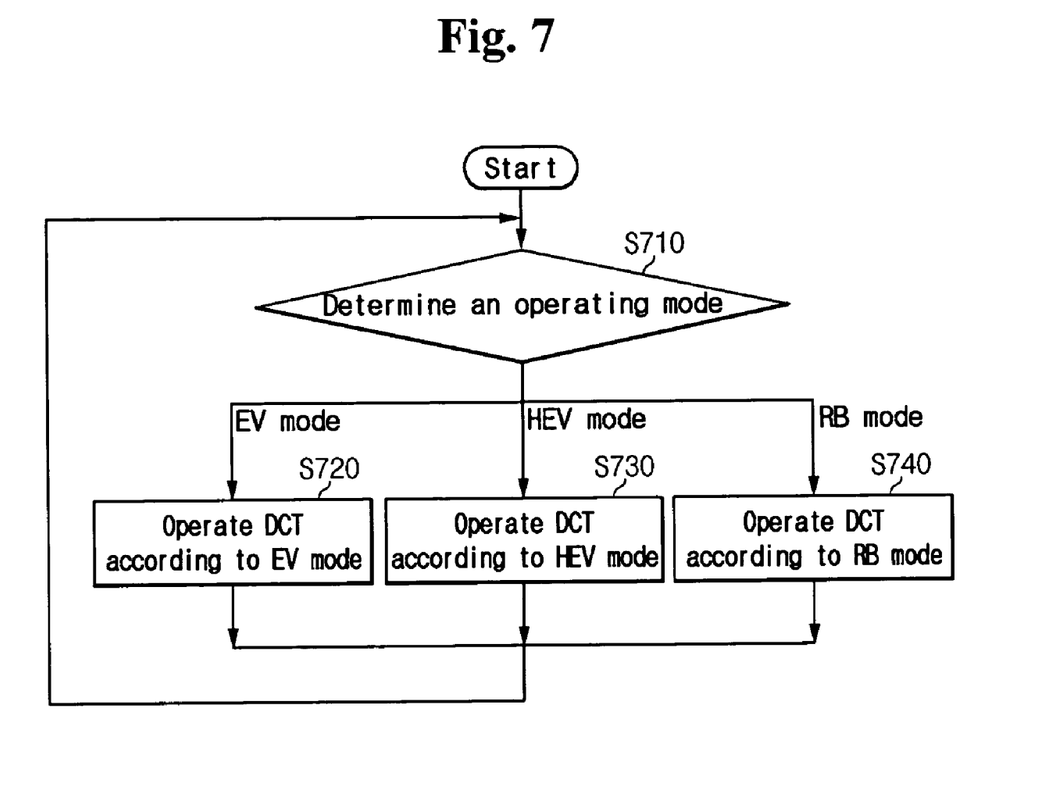
FIG. 7 is a flowchart showing a method for controlling a DCT according to an embodiment of the present invention.

In RB mode, braking and inertial energy is input to the motor sequentially through the differential gear DIFF, the first output gear 135, the first output shaft 130, the second driven gear D2 on the first output shaft 130, the second drive gear G2 on the second input shaft 120, the motor idle gear IG, and the motor gear MG, which is the reverse sequence of power transmission flow in the second speed. Such a method for operating a DCT according to an embodiment of the present invention is shown in FIG. 7. First, at step S710, depending upon the driving state of a vehicle, an operation mode (either EV mode, HEV mode, or RB mode) is determined for the DCT. Then at steps S720, S730, and S740, the DCT is operated according to the determined operation mode.

A standard for determining the operation mode at step S710 may be set by a person of ordinary skill in the art. For example, the operation mode may be determined to be the RB mode when the HEV is braking or inertially running, to be the EV mode when a current SOC of the battery is above a predetermined SOC when an accelerator pedal is operated, or to be the HEV mode when the current SOC of the battery is not above the predetermined SOC when the accelerator pedal is operated.

At step S720 of operating the DCT in EV mode, the engine 102 is stopped and the first and second clutches C1 and C2 are released while the torque of the motor 103 is transmitted to a driven gear for a predetermined shift-speed (e.g., the second driven gear D2). In this case, only the torque of the motor from battery power is changed and output.

At step S730 of operating the DCT in HEV mode, the engine 102 is started by the motor 103, either the first or second clutch (C1 or C2) is engaged such that the torque of the engine 102 is transmitted to a driven gear for a target shift-speed, and the torque of the motor 103 is transmitted to a second driven gear. In this case, the torque of the motor 103 is controlled based on current vehicle speed and depression amount of an accelerator pedal.

At step S730 of operating the DCT in RB mode, the first and second clutches C1 and C2 are released while a torque is transmitted from a driven gear for a predetermined shift-speed (e.g., the second driven gear D2) to the motor 103, such that the motor 103 is driven as an electric generator by the braking and inertial energy of the HEV.

While the DCT operates in the various modes, the operation process repeatedly returns to step S710 of determining the operation mode, and accordingly the DCT may always be operated by an operation mode appropriate to a running state of the HEV.

According to an embodiment of the present invention, a DCT for an HEV is provided with, in addition to an operation method thereof, a layout in power transmission scheme and a motor location that are optimal for changing and outputting torque of an engine and a motor. Therefore, such a DCT may be used for an HEV, overcoming the inefficiency of a conventional CVT with a metal belt. By an application of such a DCT to an HEV, torque of an engine and a motor may be manipulated according to various operation modes. In addition, convenience of an automatic transmission may also be achieved by adapting two clutches and an automatically shifting device to a scheme similar to a conventional manual transmission.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A double clutch transmission for a hybrid electric vehicle having an engine and a motor, the double clutch transmission comprising:
   a main input shaft receiving torque from the engine;
   a first input shaft rotating coaxially with the main input shaft;
   a second input shaft rotating coaxially with the main input shaft and along an exterior circumference of the first input shaft;
   first and second clutches for selectively transmitting torque of the main input shaft to either the first or the second input shaft;
   a drive gear unit including a plurality of drive gears disposed on the first and second input shafts;
   a first output device including a first output shaft disposed parallel to and apart from the first and second input shafts by a predetermined distance and also including a plurality of driven gears and a first output gear thereon, such that torque of drive gears on the first and second input shafts are selectively changed and output;
   a second output device including a second output shaft and a reverse idle shaft disposed parallel to and apart from the first and second input shafts by predetermined distances, a plurality of driven gears, a second output gear, a reverse driven gear disposed on the second output shaft, and a plurality of reverse mediating gears disposed on the reverse idle shaft, such that torque of drive gears on the first and second input shafts are selectively changed and output;
   a differential gear connected to both the first output gear and the second output gear; and
   a motor input/output unit for selectively transmitting torque of the motor to the second input shaft through a plurality of gears and a drive gear on the second input shaft.

2. The double clutch transmission of claim 1, wherein the drive gear unit comprises:
   first, third, and fifth drive gears formed on either the first or second input shaft; and
   second, fourth, and sixth drive gears formed on the remaining other input shaft.

3. The double clutch transmission of claim 2, wherein:
   the first, third, and fifth drive gears are formed on the first input shaft; and
   the second, fourth, and sixth drive gears are formed on the second input shaft.

4. The double clutch transmission of claim 2, wherein the first, second, third, fourth, fifth, and sixth drive gears are disposed in a sequence of the second drive gear, the fourth drive gear, the sixth drive gear, the third drive gear, the first drive gear, and the fifth drive gear from the engine.

5. The double clutch transmission of claim 2, wherein the first output device comprises:
   the first output shaft;
   first, second, third, and fourth driven gears disposed on the first output shaft and engaged with the first, second, third, and fourth drive gears;
   a first synchronizing device for selectively transmitting torque of the first and third driven gears to the first output shaft;
   a second synchronizing device for selectively transmitting torque of the second and fourth driven gears to the first output shaft; and
   the first output gear disposed on the first output shaft and engaged with the differential gear,
   such that torque of the first, second, third, and fourth drive gears on the first and second input shafts are selectively changed and output.

6. The double clutch transmission of claim 2, wherein the second output device comprises:
the second output shaft;
the reverse idle shaft;
fifth and sixth driven gears disposed on the second output shaft and respectively engaged with the fifth and sixth drive gears;
a first mediating gear disposed on the reverse idle shaft and engaged with the first drive gear;
a second mediating gear disposed on the reverse idle shaft;
the reverse driven gear disposed on the second output shaft and engaged with the second mediating gear;
a third synchronizing device for selectively transmitting torque from the fifth driven gear to the second output shaft;
a fourth synchronizing device for selectively transmitting torque from the sixth and reverse driven gears to the second output shaft; and
the second output gear disposed on the second output shaft and engaged with the differential gear,
such that torque of the first, fifth, and sixth drive gears on the first and second input shafts are selectively changed and output.

7. The double clutch transmission of claim 1, wherein the motor input/output unit comprises:
a motor gear disposed on a rotation shaft of the motor;
a motor idle shaft disposed parallel to and apart from the second input shaft by a predetermined distance; and
a motor idle gear formed on the motor idle shaft and commonly engaged with the motor gear and one drive gear on the second input shaft.

8. The double clutch transmission of claim 7, wherein the one drive gear on the second input shaft engaged with the motor idle gear is a drive gear for a second speed.

9. A double clutch transmission for a hybrid electric vehicle having an engine and a motor, the double clutch transmission comprising:
a main input shaft receiving torque from the engine;
a first input shaft rotating coaxially with the main input shaft;
a second input shaft rotating coaxially with the main input shaft and along an exterior circumference of the first input shaft;
first and second clutches for selectively transmitting torque of the main input shaft to the first and second input shafts;
first, third, and fifth drive gears formed on one input shaft of the first and second input shafts;
second, fourth, and sixth drive gears formed on another input shaft of the first and second input shafts;
a first output device including a first output shaft disposed parallel to and apart from the first and second input shafts by a predetermined distance and also including a plurality of driven gears and a first output gear thereon, such that torque of first, second, third, and fourth drive gears on the first and second input shafts are selectively changed and output;
a second output device including a second output shaft and a reverse idle shaft disposed parallel to and apart from the first and second input shafts by predetermined distances, a plurality of driven gears, a second output gear, and a reverse driven gear disposed on the second output shaft, and a plurality of reverse mediating gears disposed on the reverse idle shaft, such that torque of first, fifth, and sixth drive gears on the first and second input shafts are selectively changed and output;
a differential gear commonly connected to the first output gear and the second output gear; and
a motor input/output unit for selectively transmitting torque of the motor to the second input shaft through two gears and the second drive gear on the second input shaft.

10. The double clutch transmission of claim 9, wherein:
the first, third, and fifth drive gears are formed on the first input shaft; and
the second, fourth, and sixth drive gears are formed on the second input shaft.

11. The double clutch transmission of claim 9, wherein the first, second, third, fourth, fifth, and sixth drive gears are disposed in a sequence of the second drive gear, the fourth drive gear, the sixth drive gear, the third drive gear, the first drive gear, and the fifth drive gear from the engine.

12. The double clutch transmission of claim 9, wherein the first output device comprises:
the first output shaft;
first, second, third, and fourth driven gears disposed on the first output shaft and respectively engaged with the first, second, third, and fourth drive gears;
a first synchronizing device for selectively transmitting torque of the first and third driven gears to the first output shaft;
a second synchronizing device for selectively transmitting torque of the second and fourth driven gears to the first output shaft; and
the first output gear disposed on the first output shaft and engaged with the differential gear,
such that torque of the first, second, third, and fourth drive gears on the first and second input shafts are selectively changed and output.

13. The double clutch transmission of claim 9, wherein the second output device comprises:
the second output shaft;
the reverse idle shaft;
fifth and sixth driven gears disposed on the second output shaft and respectively engaged with the fifth and sixth drive gears;
a first mediating gear disposed on the reverse idle shaft and engaged with the first drive gear;
a second mediating gear disposed on the reverse idle shaft;
the reverse driven gear disposed on the second output shaft and engaged with the second mediating gear;
a third synchronizing device for selectively transmitting torque of the fifth driven gear to the second output shaft;
a fourth synchronizing device for selectively transmitting torque of the sixth and reverse driven gears to the second output shaft; and
the second output gear disposed on the second output shaft and engaged with the differential gear,
such that torque of the first, fifth, and sixth drive gears on the first and second input shafts are selectively changed and output.

14. The double clutch transmission of claim 9, wherein the motor input/output unit comprises:
a motor gear disposed on a rotation shaft of the motor;
a motor idle shaft disposed parallel to and apart from the second input shaft by a predetermined distance; and
a motor idle gear formed on the motor idle shaft and commonly engaged with the motor gear and one drive gear on the second input shaft.

* * * * *